Figure 1:
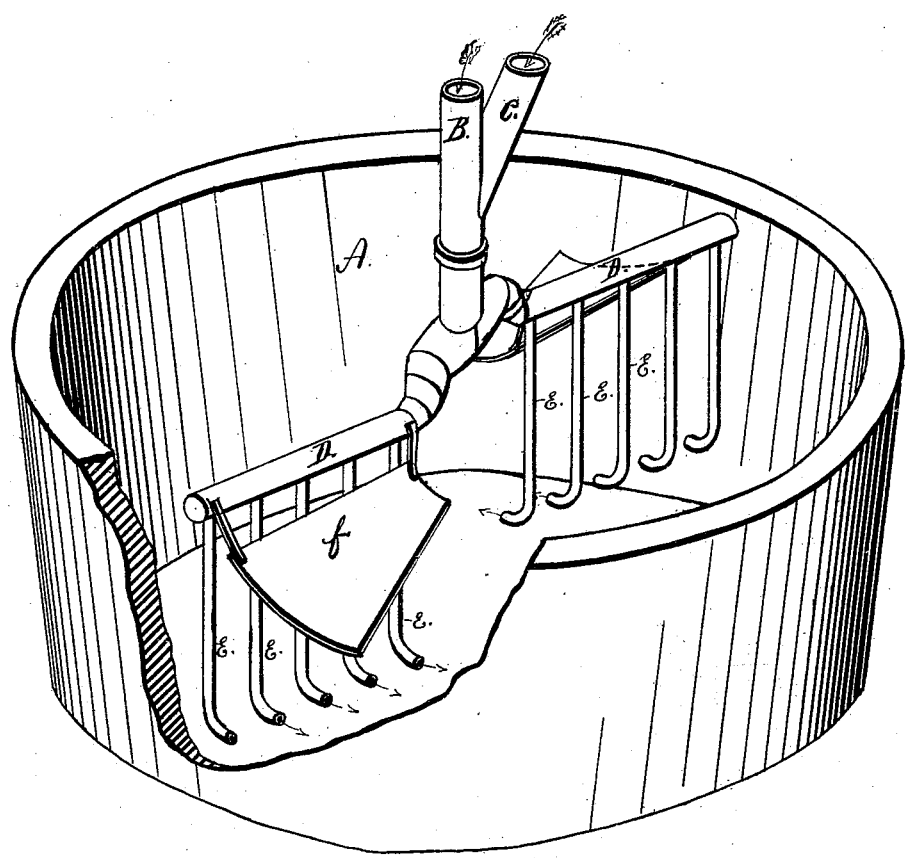

J. BRANDENBURG.
MASHING-MACHINE.

No. 190,185. Patented May 1, 1877.

WITNESSES,
L. P. Langworthy
R. W. Eaton

INVENTOR,
Jacob Brandenburg.
by Joseph A. Miller
ATTORNEY,

UNITED STATES PATENT OFFICE.

JACOB BRANDENBURG, OF OXFORD, OHIO.

IMPROVEMENT IN MASHING-MACHINES.

Specification forming part of Letters Patent No. 190,185, dated May 1, 1877; application filed October 9, 1876.

*To all whom it may concern:*

Be it known that I, JACOB BRANDENBURG, of Oxford, in the county of Butler and State of Ohio, have invented certain new and useful Improvements in Mashing-Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The drawing represents my improved mashing-machine in perspective, part of the mash-tub being shown as broken away to show the rake more clearly.

The invention consists in the peculiar arrangement of the tubular mash-rake arranged to allow heated or cool air, or other gaseous or fluid matter, to be supplied to the mash while the same is being stirred, and in the arrangement of the floats with the rake, as will be more fully set forth hereinafter.

To produce a good mash in a distillery or brewery, the same must be kept at a fixed and uniform temperature, and the whole mass kept in constant agitation in all parts, and more particularly near the bottom of the tub.

By constructing the mash-rake of tubes, the interior of which are connected with horizontal tubes, and by these with stationary inlets, so that hot or cold air or hot or cold water can be forced through the mash while the rake is made to revolve, the whole mass will be stirred, as usual, by the rake, and the air, which is forced through the tubes, will enter the lowest part of the tub and force its way upward, thus producing a violent agitation of the mash.

To prevent the air thus forced in from rising too rapidly, I arrange the floats $ff$ on the sides of the rake where the air is discharged, which floats will be partly submerged, and thus also assist in agitating the surface of the mash by forcing the mash to pass under the floats.

In the drawings, A is the mash-tub, partly shown as broken away. B and C are the inlet-pipes. D D are horizontal pipes, and E E E are the curved rake tines or pipes, which are curved in the direction opposite the motion of the rake. $ff$ are the floats.

This improved mashing-rake is suspended in the mash-tub, and arranged to be rotated in the usual manner.

The rake can be constructed out of tubes or pipes screwed together by any pipe-fitter. It is light and strong, can be readily cleansed inside and outside, and is more efficient in its operation than rakes as heretofore constructed, and much more durable.

When in operation, the mash may be supplied to the tub, and be reduced gradually by adding water of the required temperature, after which either cold or hot air may be forced into the lower part of the mash through the tubular rake while the same is revolved, and thus the temperature of the mash may be regulated and the mash more thoroughly agitated than is possible by the older means now employed. By bending the tubes E E, as shown, and providing only one outlet at the bend end, the pressure is maintained in the tube, and the steam, air, or gas escapes in a horizontal or nearly horizontal direction at or near the bottom of the tub, and thus produces a more thorough agitation of the mass.

Having thus described my invention, I claim as new and desire to secure by Letters Patent—

The combination, in a tubular mash-rake, of the two inlets B and C, communicating with the horizontal tubes D D, with the curved tubes E E E open at their curved ends only, and delivering steam, air, or water near the bottom of the mash-tub only, and in a nearly horizontal direction, substantially as described.

In testimony that I claim the foregoing as my own invention I affix my signature in presence of two witnesses.

JACOB BRANDENBURG.

Witnesses:
J. E. CHATTEN,
J. W. ROSS.